(12) United States Patent
Walters et al.

(10) Patent No.: US 11,394,677 B2
(45) Date of Patent: *Jul. 19, 2022

(54) SYSTEMS AND METHODS FOR SCREENING ELECTRONIC COMMUNICATIONS

(71) Applicant: Capital One Services, LLC, McLean, VA (US)

(72) Inventors: Austin Walters, Savoy, IL (US); Jeremy Goodsitt, Champaign, IL (US); Reza Farivar, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,101

(22) Filed: Aug. 18, 2020

(65) Prior Publication Data

US 2021/0029068 A1 Jan. 28, 2021

Related U.S. Application Data

(63) Continuation of application No. 16/518,155, filed on Jul. 22, 2019, now Pat. No. 10,785,177.

(51) Int. Cl.
*H04L 12/58* (2006.01)
*H04L 51/00* (2022.01)
(Continued)

(52) U.S. Cl.
CPC .............. *H04L 51/12* (2013.01); *G06F 40/20* (2020.01); *H04L 29/1215* (2013.01);
(Continued)

(58) Field of Classification Search
CPC .............. H04L 51/12; H04L 29/12726; H04L 61/1564; H04L 61/307; H04L 29/1215;
(Continued)

(56) References Cited

U.S. PATENT DOCUMENTS 7,016,898 B1 * 3/2006 Forlenza ............. G06F 21/6218
709/225
8,544,060 B1    9/2013 Khetawat
(Continued)

*Primary Examiner* — Michael Won
(74) *Attorney, Agent, or Firm* — Bookoff McAndrews, PLLC

(57) ABSTRACT

According to certain aspects of the disclosure, a computer-implemented method computer-implemented method may be used for screening electronic communications. The method may comprise analyzing contents of an electronic communication to determine whether the contents include sensitive information. A recipient list of the electronic communication may be compared to a screening list. Based on the analyzing and the comparing, it may be determined whether the contents are permitted to be transmitted to the recipient list. Upon determining that the contents are not permitted to be transmitted to at least one party of the recipient list, a notification may be provided to an author of the electronic communication indicating that contents are not permitted to be transmitted to the at least one party of the recipient list.

19 Claims, 5 Drawing Sheets

(51) Int. Cl.
  *H04L 51/08* (2022.01)
  *G06F 40/20* (2020.01)
  *H04L 101/37* (2022.01)
  *H04L 61/45* (2022.01)
  *H04L 9/40* (2022.01)
  *G06N 20/00* (2019.01)

(52) U.S. Cl.
  CPC ........ *H04L 29/12726* (2013.01); *H04L 51/08* (2013.01); *H04L 61/1564* (2013.01); *H04L 61/307* (2013.01); *H04L 63/0227* (2013.01); *G06N 20/00* (2019.01)

(58) Field of Classification Search
  CPC . H04L 63/0227; H04L 51/08; H04L 63/1408; H04L 63/101; H04L 63/20; G06F 40/20; G06F 21/62; G06F 21/6263; G06N 20/00; G06N 3/08
  See application file for complete search history.

(56) References Cited

U.S. PATENT DOCUMENTS

| | | | |
|---|---|---|---|
| 8,682,982 B2 * | 3/2014 | Jung | H04L 51/12 709/206 |
| 9,363,239 B1 * | 6/2016 | Luman | H04L 51/18 |
| 9,866,391 B1 | 1/2018 | Crites et al. | |
| 10,417,432 B2 | 9/2019 | Mahaffey et al. | |
| 10,637,813 B2 | 4/2020 | Manning et al. | |
| 2002/0120600 A1 * | 8/2002 | Schiavone | H04L 51/12 |
| 2003/0095550 A1 | 5/2003 | Lewis et al. | |
| 2004/0073634 A1 | 4/2004 | Haghpassand | |
| 2005/0262557 A1 | 11/2005 | Fellenstein et al. | |
| 2005/0278430 A1 | 12/2005 | Cato | |
| 2007/0005708 A1 | 1/2007 | Juliano | |
| 2007/0150299 A1 | 6/2007 | Flory | |
| 2007/0261112 A1 | 11/2007 | Todd et al. | |
| 2009/0214034 A1 | 8/2009 | Mehrotra et al. | |
| 2009/0282494 A1 * | 11/2009 | Bhide | H04L 51/00 726/28 |
| 2011/0202756 A1 | 8/2011 | West | |
| 2012/0011361 A1 | 1/2012 | Guerrero et al. | |
| 2013/0104246 A1 * | 4/2013 | Bear | H04L 63/10 726/28 |
| 2013/0254314 A1 * | 9/2013 | Chow | G06F 16/957 709/206 |
| 2014/0244765 A1 * | 8/2014 | Smith | H04L 51/26 709/206 |
| 2015/0020151 A1 * | 1/2015 | Ramanathan | G06F 21/10 726/1 |
| 2015/0040244 A1 | 2/2015 | DeBenedictis et al. | |
| 2015/0150091 A1 | 5/2015 | Bruce et al. | |
| 2015/0180876 A1 * | 6/2015 | Young | H04L 63/101 726/30 |
| 2016/0173424 A1 * | 6/2016 | Fuhrmann | H04L 51/28 709/206 |
| 2017/0026321 A1 | 1/2017 | Ciavatta | |
| 2017/0032455 A1 | 2/2017 | Hart | |
| 2017/0295197 A1 * | 10/2017 | Parimi | H04L 63/10 |
| 2018/0375877 A1 | 12/2018 | Jakobsson et al. | |
| 2019/0020687 A1 * | 1/2019 | Noon | H04L 63/105 |
| 2019/0268292 A1 | 8/2019 | Manning et al. | |
| 2019/0268377 A1 | 8/2019 | Parry | |
| 2020/0067936 A1 * | 2/2020 | Ojha | H04L 63/1466 |
| 2020/0137110 A1 * | 4/2020 | Tyler | H04L 63/145 |
| 2020/0358798 A1 * | 11/2020 | Maylor | H04L 63/1483 |

\* cited by examiner

SYSTEMS AND METHODS FOR SCREENING ELECTRONIC COMMUNICATIONS

CROSS-REFERENCE TO RELATED APPLICATION(S)

This patent application is a continuation of and claims the benefit of priority to U.S. Nonprovisional patent application Ser. No. 16/518,155, filed on Jul. 22, 2019, the entirety of which is incorporated herein by reference.

TECHNICAL FIELD

Various embodiments of the present disclosure relate generally to screening electronic communications, and more specifically to screening electronic communications based on a recipient list of the communication and contents of the communication.

BACKGROUND

Electronic communications, such as electronic messages (e.g., e-mail), may contain information (such as sensitive or confidential information) that should not be viewed by certain parties. It may be difficult for an author of an electronic communication to track whether particular types of information are considered confidential or restricted. In some cases, an author may transmit a communication containing restricted information, without realizing such information was restricted or realizing too late that the information should not have been sent.

Adding further layers of complexity to the issue, certain agreements (e.g., non-disclosure agreements) may allow transmission of certain categories of information. However, these agreements may be numerous and diverse, and it may be challenging for authors of messages to recall whether or not a non-disclosure agreement or another type of agreement is in place. Furthermore, agreements may treat different categories of information differently, and may grant certain permissions only to certain individuals. The potential complexity of such agreements adds to difficulties in determining whether or not a message may be sent and may lead to errors (e.g., sending confidential information to parties who should not receive it) or to delays in sending communications.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for screening electronic communications. Each of the examples disclosed herein may include one or more of the features described in connection with any of the other disclosed examples.

In one example, a computer-implemented method may be used for screening electronic communications. The method may include analyzing contents of an electronic communication to determine whether the contents include sensitive information; comparing a recipient list of the electronic communication to a screening list; based on the analyzing and the comparing, determining whether the contents are permitted to be transmitted to the recipient list; and upon determining that the contents are not permitted to be transmitted to at least one party of the recipient list, providing a notification to an author of the electronic communication indicating that contents are not permitted to be transmitted to the at least one party of the recipient list.

According to another aspect of the disclosure, a computer-implemented method for screening electronic communications may include classifying at least one party of a recipient list of an electronic communication based on the at least one party's data access permissions; analyzing contents of the electronic communication to determine whether transmitting the electronic communication to the at least one party violates the at least one party's data access permissions; and upon determining that transmission of the electronic communication violates the at least one party's data access permissions, providing a notification to an author of the electronic communication.

According to still another aspect of the disclosure, a computer-implemented method for screening electronic communications may include receiving information pertaining to contents of an electronic communication and a recipient list of the electronic communication; comparing the information to a screening list; determining, based on the comparison, if transmission of the electronic communication to the recipient list is permitted; and providing a notification to an author of the electronic communication if the transmission is not permitted.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides methods and systems for screening electronic communications by analyzing the contents of the electronic communication and the list of recipients of the electronic message. While electronic communications are referenced herein as an exemplary application for the systems and methods described herein, it will be understood that this disclosure is not limited to electronic communications and may also apply in other contexts, such as file-sharing, webpages, publications, and/or presentations. The systems and methods described herein may be used in order to alert a sender and/or author of a communication that the communication contains information that should not be sent to one or more of the recipients. Additionally or alternatively, the systems and methods may block transmission of a message when the message contains information that one or more recipients do not have permission to view. For example, the systems and methods may utilize artificial intelligence or other methods to analyze contents of a communication, compare the contents to one or more screening lists (e.g., non-disclosure agreements), and determine whether the intended recipients have adequate permissions.

Figure 1:
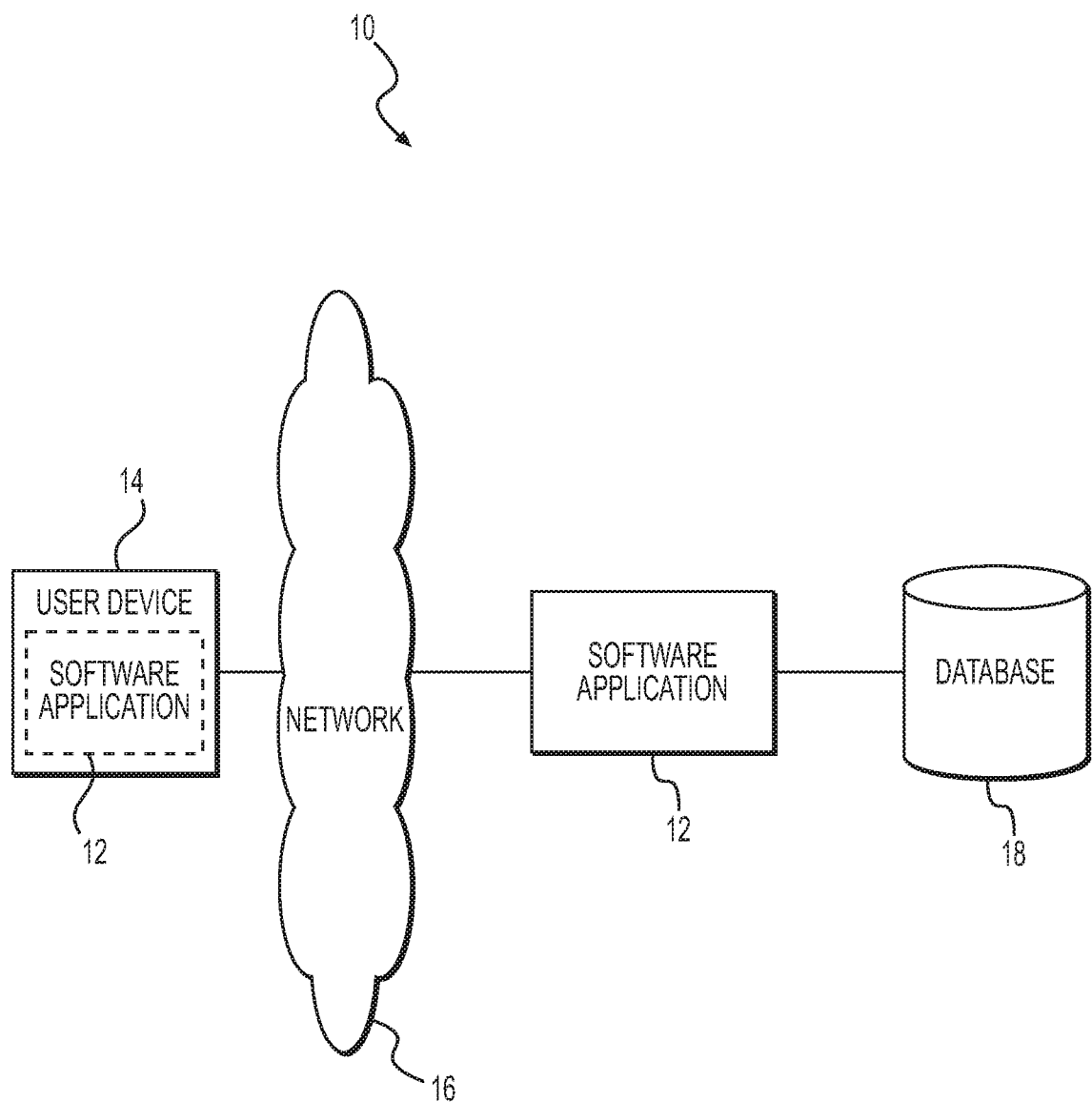
FIG. 1 is a block diagram of a system for screening electronic communications, according to one or more embodiments.

FIG. 1 shows an exemplary system 10 for analyzing electronic communications. Screening system 10 may include a software application 12 configured to perform a variety of operations, as will be discussed in further detail below. Application 12 may employ one or more microservices. For example, application 12 may make use of cloud computing, on premises software, an API service, and/or a an AWS Lambda. Application 12 may be installed on a device 14 (also referred to herein as a user device) (e.g., a computer or a mobile device, as described in connection with FIG. 5) associated with one or more user(s), or may be installed remotely and accessed via a network 16 (e.g., application 12 may be cloud-based). Indeed, multiple devices 14 may access application 12 via, for example, network 16. Alternatively, multiple devices 14 may each have application 12 installed locally thereon. A combination of network-based and locally based applications may be used. For example, one or more portions of application 12 may be installed locally on device 14 associated with a user, and one or more other portions of application 12 may be accessed via network 16. Any number of devices 14 associated with any number of users may access application 12. Users of devices 14 may be, for example, members of a same organization (e.g., business, company, charity, etc.). Rules of application 12, discussed below, may apply in the same manner to each of the users or may differ across users. That is, certain users may have different permissions, access rules, or other characteristics than other users. For example, while some of the users may be able to override aspects of application 12, other users may not have such abilities. Application 12 may be used with multiple software applications across multiple devices 14. A single user may, for example, be associated with more than one device 14, and application 12 may be used on different devices 14 (e.g., desktop computer, laptop computer, mobile device, tablet, etc.) Additionally or alternatively, application 12 may be utilized with multiple applications on a single device 14. For example, application 12 may be used whether a user of device 14 is employing an internet browser, an e-mail application, a chat application, etc.

Application 12 may store data in and/or access data from a database 18. Database 18 may have any features known or to become known in the art. Information from database 18 may be utilized across multiple user devices 14. Although one database 18 is referenced herein, it will be appreciated that multiple databases 18 may be employed. Database 18 may be comprised of any number of tables that may interact in any suitable way.

Application 12 may utilize artificial intelligence or machine learning capabilities. For example, application 12 may utilize natural language processing, a trained neural network model, a deep learning model, a supervised machine learning model, and/or an artificial intelligence model. Multiple machine learning models may be used. For example, a separate model could apply to images, audio, and/or text. Additionally, application 12 may utilize/invoke any methodology that is known or becomes known. Application 12 may be capable of upgrading over time, either via intervention by a party such as a user of device 14 or automatically. During operation, the quantity and/or quality of capabilities of application 12 may increase as application 12 gains access to more information.

Application 12 may have access to details regarding one or more screening lists. For example, data regarding a screening list may be stored in database 18. Screening lists may include non-disclosure agreements, ethical walls, protective orders, corporate agreements (e.g., co-development or sales agreements), confidentiality agreements, trade secret protocols, etc. Although non-disclosure agreements may be particularly referenced herein, it will be understood that uses of system 10 are not limited to non-disclosure agreements and may apply to a variety of contexts. Details of a screening list may be input manually or automatically into application 12 and/or database 18. For example, data regarding a screening list may be populated using, for example, artificial intelligence or other automated methods.

The details of a screening list may include, for example, types of information protected, limited, authorized by, or otherwise covered by the screening list. For example, the screening list may restrict sharing of certain types of information. For example, under the screening list, information on certain topics or in certain types of electronic files may or may not be shared. Data stored in application 12 and/or database 18 may include information such as allowed/disallowed file extensions, keywords, combinations of words, data format (e.g., social security numbers or computer code), etc. Information may be input into database 18 using pre-defined categories that may be common across multiple agreements or may be customized based on a particular agreement. For example, data may be classified according to different levels of sensitivity (e.g., top secret, confidential, public, etc.).

Details of the screening list may also include information relating to parties affected by the screening list. For example, the screening list may allow sharing only with certain parties, may bar sharing with particular parties, or may assign different permissions to different parties. Data stored in application 12 and/or database 18 may include, for example, names of corporate entities or individuals bound by the agreement and/or names of corporate entities or individuals who have different permission levels. For example, details regarding a corporate entity may include a domain name, IP address, or another contact method for the corporate entity (e.g., a fax number for an electronic fax). Details regarding individuals may include e-mail addresses, full names, nicknames, aliases, corporate title, or other information. Information regarding an entity or an individual may include variants for any of the categories described above. For example, a name of an individual or entity may also include nicknames, name variants, or aliases. The variants may be obtained from the individual or entity, from public records, or from other sources. For example, multiple domain names associated with a corporate entity in the Internet Corporation for Assigned Names and Numbers (ICANN) can each be accessed by application 12. For example, the multiple domain names can be stored in database 18, or application 12 can query ICANN at any point. For example, application 12 may query ICANN during a time that details of the screening list are first uploaded and/or when an electronic communication is being analyzed. Details regarding entities or individuals (e.g., ICANN domain names) can also be updated over time, as the information may change.

A screening list may include details tying parties (e.g., individuals and/or corporate entities) to types of information. A screening list may also contain different information relating to subsets of particular parties. For example, a corporate entity may have a screening list associated with it. Certain individuals or subsets of the corporate entity may have different access permissions than other individuals or subsets. For example, a first group of parties associated with the corporate entity may have permission to see all types of information. A second group may have access to all information except for one type (e.g., computer code). A third group may have access to PowerPoint presentations but not to Excel files. Certain groups may have access to information with different levels of sensitivity. For example, particular groups may have access to top secret information, whereas other groups may have access to only less sensitive information. Information may be restricted based on a title of a party. For example, certain information may be restricted to attorneys or other parties having duties of confidentiality.

Figure 2:
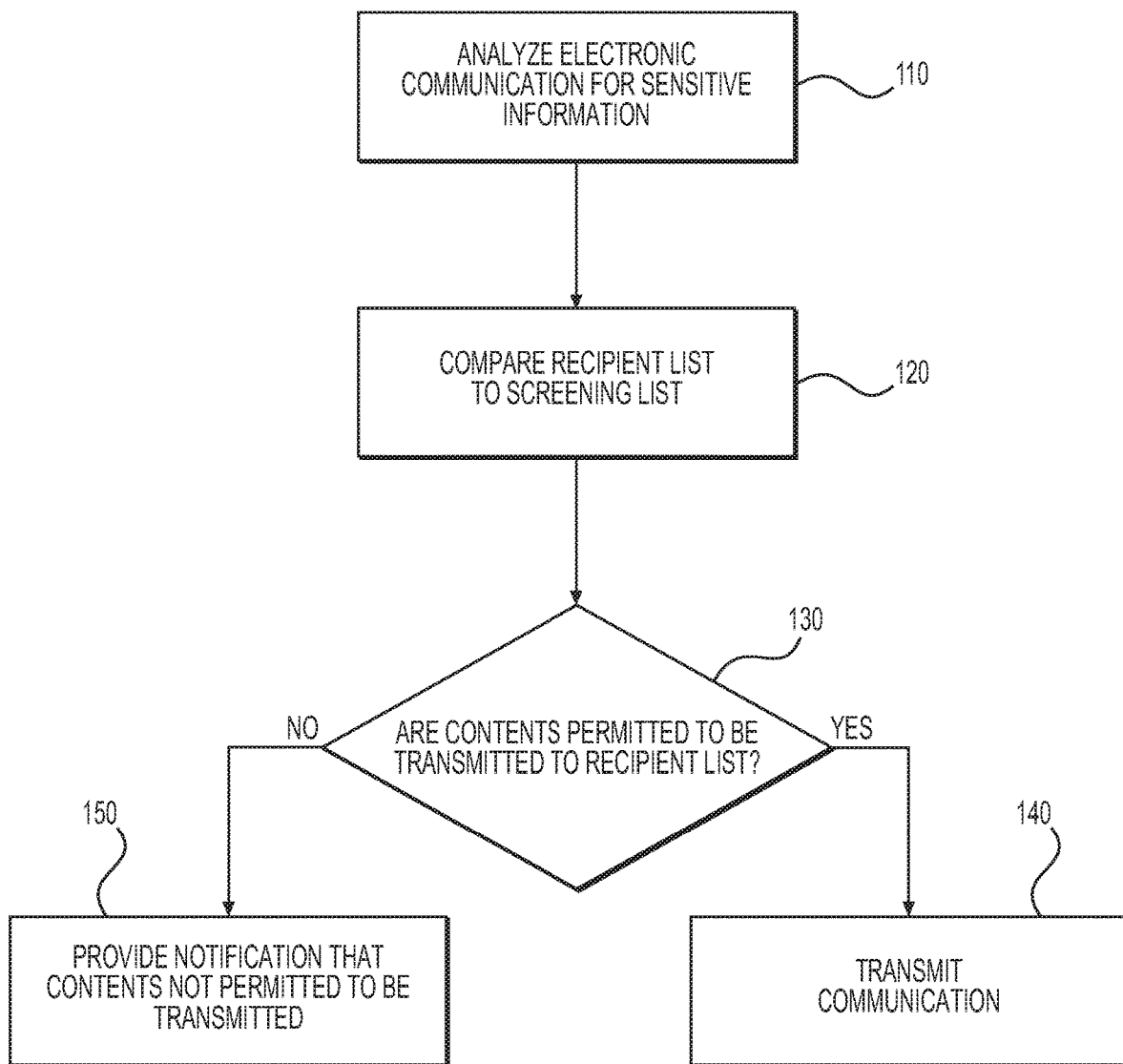
FIGS. 2-4 are flow charts showing exemplary methods of screening electronic communications, according to one or more embodiments.
Figure 3:
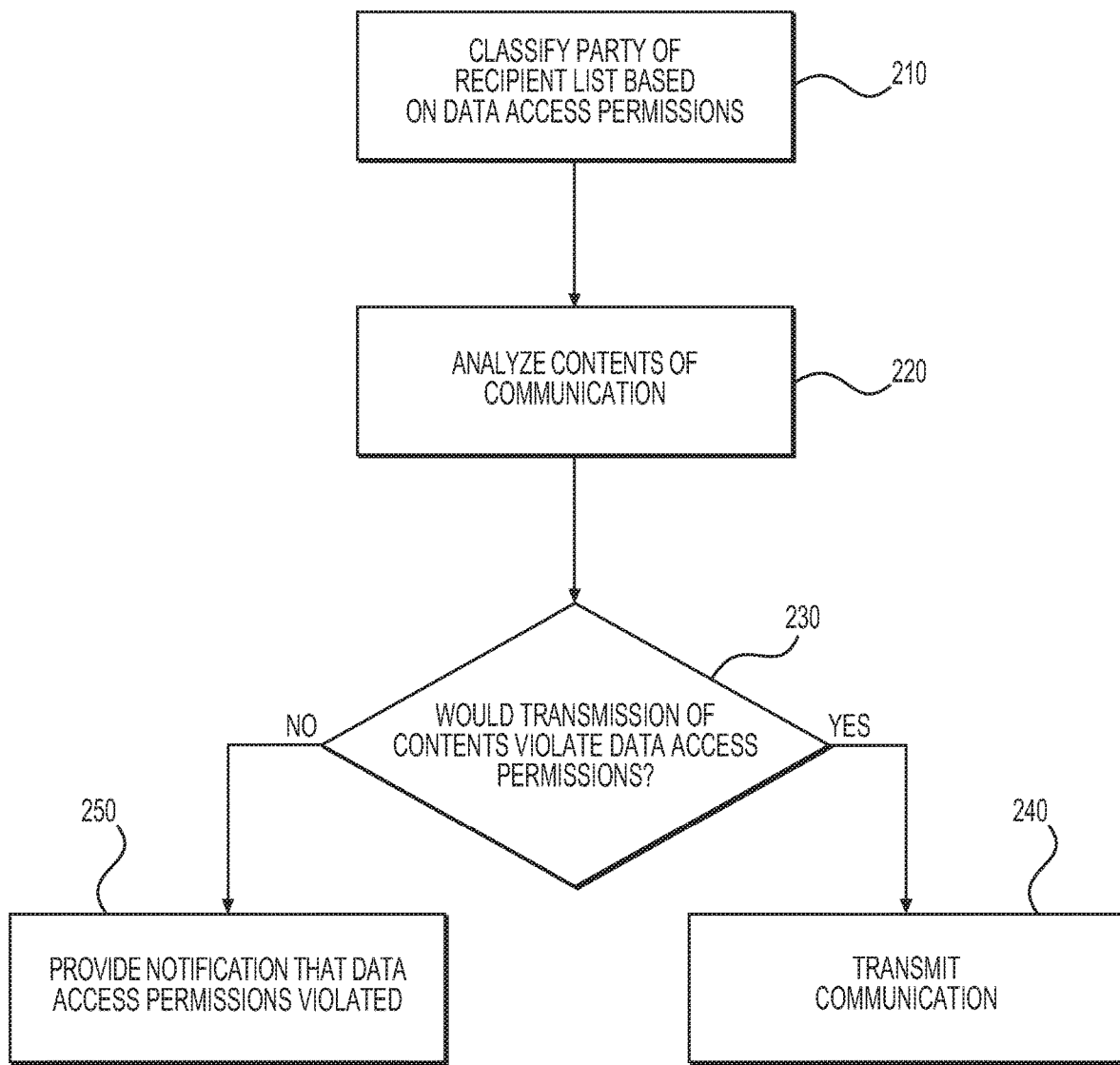
Figure 4:
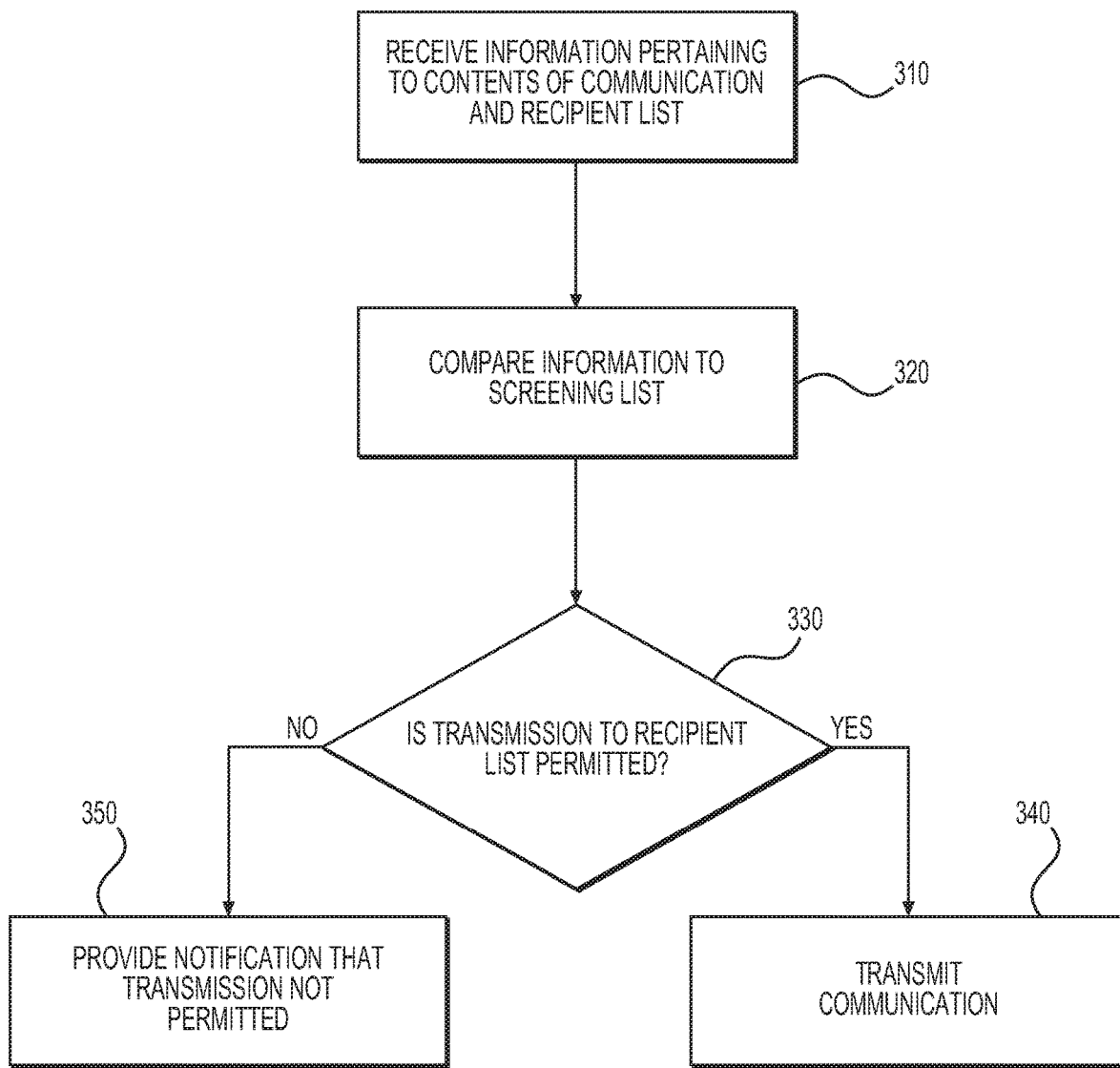

FIGS. 2-4 depicts exemplary methods 100, 200, 300, respectively, for screening electronic communications. A user of device 14 of system 10 may compose an electronic communication that the user would like to transmit. The electronic communication may include text, attachments, images, computer code, or other types of information. The communication may be addressed to one or more individuals, entities, reflectors, mailing lists, listservs, etc. Before the user may transmit the communication, system 10 may analyze the communication using the steps described below. For example, all or a subset of the steps below may occur upon a particular action by the user, such as placing a cursor on a button (e.g., a "send" button), indicating a desire to transmit the message. Alternatively, other actions may trigger completion of all or some of the steps of methods 100, 200, and/or 300 (e.g., pressing a "send button," a "screen" button, etc.). The order of steps described herein is not limiting, but rather, the steps of methods 100, 200, and/or 300 may be performed in various orders and combinations without departing from the scope of this disclosure.

Turning first to method 100 illustrated in FIG. 2, in step 110, a portion of system 10, such as application 12, may analyze the electronic communication to determine if the communication includes sensitive information. In doing so, application 12 may consider any of the types of information described above. For example, application 12 may analyze attachment file extension types, text of the communication, embedded images, hyperlinks, etc. Whether information is sensitive or not may be defined by a screening list (e.g., a non-disclosure agreement), as discussed above. Additionally or alternatively, certain types of information, such as SSI, may be classified as sensitive regardless of whether a screening list classifies the information as sensitive.

In step 120, a portion of system 10, such as application 12, may compare a recipient list to a screening list. As discussed above, application 12 may determine whether a corporate entity associated with one or more recipients is associated with one or more screening lists. For example, application 12 may query WHOIS in order to determine an entity associated with a domain name and may populate/store those domain names in database 18 in advance of, or at the time of, the communication being screened. Application 12 may also determine whether individual recipients of the communication are associated with one or more screening lists. As discussed above, application 12 may compare names, e-mail addresses, aliases, nicknames etc. to a screening list (stored, e.g., in database 18).

Step 120 may be performed either before or after step 110. Step 120 may be performed regardless of the results of step 110, or step 120 may be performed only if the analysis of step 110 uncovers sensitive information. Similarly, step 110 may be performed regardless of the results of step 120, or step 110 may be performed only if the analysis of step 120 identifies parties that are or are not the subject of a screening list.

In step 130, application 12 may determine whether the contents are permitted to be transmitted to the parties on the recipient list. Application 12 may use any of the techniques described above with regard to FIG. 1 and/or step 130 may utilize the analyses of steps 110 and/or 120. In step 130, application 12 may analyze a screening list to determine whether the contents of the intended communication can be transmitted to the intended screening list. As discussed above with respect to FIG. 1, application 12 may determine whether, if the communication contains sensitive information, the parties on the recipient list are permitted to receive that data. Application 12 may apply rules of a screening list. If an entirety of a corporate entity (or other entity) is permitted to access the contents of the message, then application 12 may determine that a message is permitted to be transmitted if all of the recipients of the message have e-mail addresses associated with the corporate domain. If only certain individuals of the entity are permitted to access the contents of the message, then application 12 may determine whether the individual intended recipients have the necessary permissions in order to receive the intended communication.

If, in step 130, application 12 determines that each of the intended recipients of the communication is permitted to access all of the information in the communication, then, in step 140, application 12 may permit the application from which the communication was generated to transmit the message or may itself transmit the message.

If, in step 130, application 12 determines that one or more of the intended recipients is not permitted to access all of the information in the communication, then, in step 150, application 12 may notify the user that intends to send the message that the message is not permitted to be transmitted. Application 12 may provide additional information to the user regarding the reasons why the message is not permitted. For example, application 12 may provide to the user via user device 14 a list of individuals who may not receive the communication, details about the sensitive information, and/or specific information about which recipients on the recipient list have access to or don't have access to particular information in the message.

Application 12 may block sending of a communication if it is not permitted to be sent to all of the intended recipients. Alternatively, application 12 may provide a warning in step 150 that can be overridden by the user. Only certain users may have the permissions necessary to override the determination by application 12 that the message is not permitted to be transmitted. Additionally or alternatively, application 12 may have functionality that enables the user to revise the message contents or the recipient list so that all of the recipients have access to all of the message contents. After the user revises the message, the user may have the capability to transmit (or restart the screening process of method 100) the message. Application 12 may also provide information to the user regarding the intended communication and the reasons why it may not be transmitted to a third party. The user may have authority to transmit the message as-is, or may perform other steps, such as redacting the message or removing certain users.

FIG. 3 depicts a further exemplary method 200 for screening electronic communications. Method 200 may have any of the steps of method 100 and steps of methods 200 and 100 may be combined in any manner without departing from the scope of this disclosure.

In step 210, a portion of system 10, such as application 12, may classify at least one party of a recipient list based on the data access permissions of the party. Step 210 may utilize any of the techniques described above with respect to steps 120 and/or 130 of method 100, in particular. In step 210, as discussed above, application 12 may determine whether a corporate entity associated with one or more recipients is associated with one or more screening lists. For example, application 12 may query WHOIS in order to determine an entity associated with a domain name and may populate/store those domain names in database 18 in advance of or at the time of the communication being screened. Application 12 may also determine whether individual recipients of the communication are associated with one or more screening lists. As discussed above, application 12 may compare names, e-mail addresses, aliases, nicknames etc. to a screening list (stored, e.g., in database 18). Application 12 may determine what permissions the at least one party has according to any applicable screening list. For example, application 12 may determine whether the at least one party has permissions to view all information, a subset of information, certain file extensions, etc. As discussed above, permissions may be based on an entity or individual level. For example, all individuals associated with a particular domain name may have the same permissions, or permissions may vary across individuals. Application 12 may repeat step 210 for all recipients on a recipient list, either iteratively in series or simultaneously in parallel.

In step 220, application 12 may analyze the contents of the electronic communication to determine if the communication includes sensitive information. Step 220 may use any of the techniques of step 110, described above. Application 12 may consider any of the types of information described above. For example, application 12 may analyze attachment file extension types, text of the communication, embedded images, hyperlinks, etc. Whether information is sensitive or not may be defined by a screening list (e.g., a non-disclosure agreement) associated with the at least one individual classified in step 210. Additionally or alternatively, certain types of information, such as a social security number SSN, may be classified as sensitive regardless of whether a screening list classifies the information as sensitive. Although step 220 is described after step 210, it will be appreciated that step 210 may be performed following step 220. Step 220 may only be performed if the analysis of step 210 produces a particular result or may be performed regardless of the outcome of step 210. For example, step 220 may be omitted if step 210 shows that all of the recipients have access to all categories of information.

In step 230, which may utilize any of the techniques of step 130, application 12 may determine whether the intended recipients of the communication are permitted to receive the contents of the communication. For example, as discussed above, application 12 may determine whether the comparisons of steps 210 and/or 220 result in the communication being authorized. As also discussed above, application 12 may determine whether the communication contains information (e.g., SSN, etc.) that is barred regardless of a recipient's screening list permissions. If all of the recipients are permitted to receive the communication, application 12 may transmit the communication in step 240.

If one or more of the intended recipients are not permitted to access all of the information in the communication, then, in step 250, application 12 may notify the user who intends to send the message that the message is not permitted to be transmitted. Application 12 may provide additional information to the user regarding the reasons why the message is not permitted. For example, application 12 may provide to the user a list of individuals who may not receive the communication, details about the sensitive information, and/or specific information about which recipients on the recipient list have access to or don't have access to particular information in the message. Application 12 may block sending of a communication if it is not permitted to be sent to all of the intended recipients. Alternatively, application 12 may provide a warning in step 250 that can be overridden by the user. Only certain users may have the permissions necessary to override the determination by application 12 that the message is not permitted to be transmitted. Additionally or alternatively, application 12 may have functionality that enables the user to revise the message contents or the recipient list so that all of the recipients have access to all of the message contents. After the user revises the message, the user may have the capability to transmit the message (or restart the screening process of method 200). Application 12 may also provide information to the user regarding the intended communication and the reasons why it may not be transmitted to a third party. The user may have authority to transmit the message as-is, or may perform other steps, such as redacting the message or removing certain users.

FIG. 4 illustrates a third exemplary method 300. In step 310, a component of system 10, such as application 12, may receive information pertaining to contents of a communication and a recipient list of the communication. In step 310, application 12 may receive any of the information described above, including that described with respect to steps 110, 120, 210, and/or 220. For example, application 12 may receive information regarding contents of a body of a communication and/or attachments to a communication, including attachment file extension types, text of the communication, embedded images, hyperlinks, etc. Application 12 may also receive information regarding recipients of the communication, including information about individual recipients and/or entities associated with the recipients. Application 12 may query WHOIS in order to determine an entity associated with a domain name and may populate/store those domain names in database 18 in advance of, or at the time of, the screening of the communication.

In step 320, application 12 may compare the information received in step 310 to a screening list. Step 320 may utilize any of the techniques of steps 110, 120, 210, and/or 220, as described above. Application 12 may determine whether entities or individual recipients of the communication are associated with one or more screening lists. As discussed above, application 12 may compare names, domain names, e-mail addresses, aliases, nicknames etc. to one or more screening lists (e.g., a screening list stored in database 18). Application 12 may also determine whether the contents of the communication includes any information associated with a screening list. For example, application 12 may analyze screening lists associated with one or more recipients of the screening list. Alternatively, the communication may be compared to an entire library of screening lists or a subset of a library of screening lists.

In step 330, application 12 may determine whether transmission of the message is permitted to the recipient. Step 330 may use any of the techniques of steps 130 and/or 230, described above. Step 330 may use the results of step 320. For example, step 330 may compare a recipient's permissions from a screening list to the contents of the communication at issue. If the contents of the communication are restricted by a screening list, application 12 may determine whether the each of the recipients of the communication has permission to view the contents. Alternatively or additionally, if one or more recipients of the message are affected by a screening list, application 12 may determine whether the contents are permitted to be sent according to that screening list. In step 330, application 12 may also consider rules or limitations that are not associated with any particular screening list. For example, certain types of information, such as 551, may be classified as sensitive regardless of whether a screening list classifies the information as sensitive. Such information may be restricted to all recipients or may be restricted unless a recipient has certain authorizations granted by a screening list.

If, in step 330, application 12 determines that each of the intended recipients of the communication is permitted to access all of the information in the communication, then, in step 340 (which may use any of the techniques of steps 140 and/or 240), application 12 may permit the application from which the communication was generated to transmit the message or may itself transmit the message.

If, in step 330, application 12 determines that one or more of the intended recipients is not permitted to access all of the information in the communication, then, in step 350 (which may use any of the techniques of steps 150 and/or 250), application 12 may notify the user that intends to send the message that the message is not permitted to be transmitted. Application 12 may provide additional information to the user regarding the reasons why the message is not permitted. For example, application 12 may provide to the user a list of individuals who may not receive the communication, details about the sensitive information, and/or specific information about which recipients on the recipient list have access to or don't have access to particular information in the message.

Application 12 may block sending of a communication if it is not permitted to be sent to all of the intended recipients. Alternatively, application 12 may provide a warning in step 350 that can be overridden by the user. Only certain users may have the permissions necessary to override the determination by application 12 that the message is not permitted to be transmitted. Additionally or alternatively, application 12 may have functionality that enables the user to revise the message contents or the recipient list so that all of the recipients have access to all of the message contents. After the user revises the message, the user may have the capability to transmit the message (or restarting the screening process of method 300). Application 12 may also provide information to the user regarding the intended communication and the reasons why it may not be transmitted to a third party. The user may have authority to transmit the message as-is, or may perform other steps, such as redacting the message or removing certain users.

Figure 5:
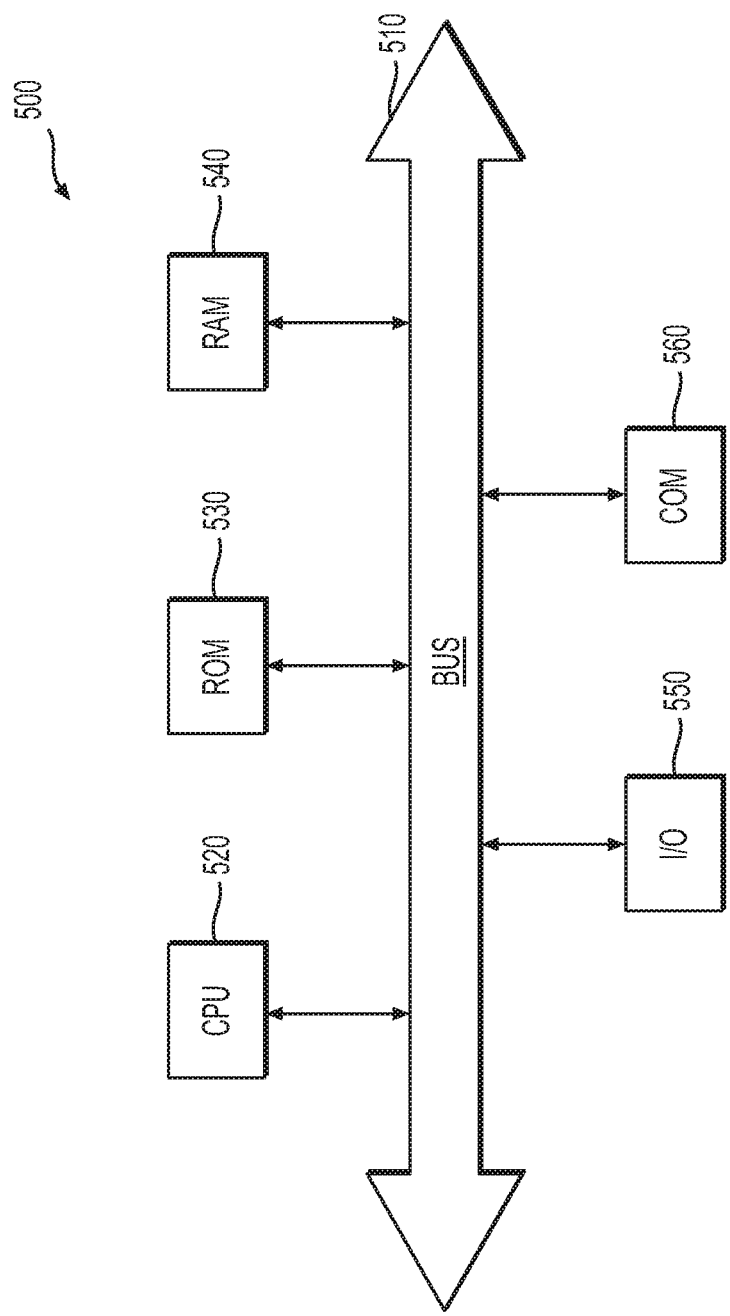
FIG. 5 depicts an example system that may execute techniques presented herein.

FIG. 5 depicts a high-level functional block diagram of an exemplary computer device or system, in which embodiments of the present disclosure, or portions thereof, may be implemented, e.g., as computer-readable code. In some implementations, the user device(s) 14 (depicted in FIG. 1) may correspond to device 500. Additionally, each of the exemplary computer servers, databases, user interfaces, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4, may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method, comprising: receiving, with a processor of a computing device associated with a sender or with a processor of a computing device in communication with the computing device associated with the sender, electronic communication data that includes content data and a recipient list;
   in response to receiving, via the processor, an indication that a selection tool of the computing device is positioned over a button of a graphical user interface associated with sending the electronic communication data, determining, with the processor, whether each and every recipient in the recipient list is permitted to receive the content data included in the received electronic communication data by:
     identifying whether the content data includes at least one category of data associated with at least one respective access restriction rule; and
     in response to the identifying, determining, with the processor, whether respective content access permission data for each and every recipient of the recipient list complies with the at least one respective access restriction rule associated with the identified at least one category of data; and
     in response to determining that the respective content access permission data for at least one recipient in the recipient list does not comply, causing, with the processor, the computing device associated with the sender to:
       disable the button of the graphical user interface and update a display of the button so as to indicate that the button is disabled;
       block the electronic communication data from being transmitted to the recipient list; and
       provide a notification indicating that at least one recipient in the recipient list is not permitted to receive at least a portion of the content data.

2. The method of claim 1, wherein:
   the recipient list includes at least one name of the at least one recipient of the recipient list; and
   at least one respective access restriction rule associated with at least one category of data included in the content data is a rule restricting access to the at least one category of data based on one or more recipients in a screening list.

3. The method of claim 1, wherein at least one respective access restriction rule associated with at least one category of data included in the content data is a rule restricting access to the at least one category of data based on a predetermined definition of a particular subject matter as sensitive data.

4. The method of claim 1, wherein the identifying of whether the content data has at least one category of data associated with at least one respective access restriction rule includes analyzing the content data via a trained machine learning model.

5. The method of claim 1, wherein at least a portion of the method is performed by a microservice.

6. The method of claim 1, wherein the notification lists the at least one recipient of the recipient list that is not permitted to receive at least a portion of the content data.

7. The method of claim 1, wherein the identifying whether the content data has at least one category of data associated with at least one respective access restriction rule includes classifying a file type of a file included in the content data.

8. The method of claim 1, wherein at least one respective access restriction rule associated with at least one category of data included in the content data is a rule restricting access to the at least one category of data based on whether a domain name associated with an email address of at least one recipient on the recipient list is permitted to receive information associated with the at least one category of data.

9. The method of claim 1, further comprising:
   in response to determining that the respective content access permission data for each and every recipient in the recipient list complies with the at least one respective access restriction rule associated with the identified at least one category of data, causing the content data to be transmitted to the recipients in the recipient list.

10. The method of claim 1, further comprising:
    receiving a modification to the recipient list; and
    in response to receiving the modification to the recipient list:
      modifying the recipient list based on the received modification; and
      repeating the determining of whether each and every recipient in the recipient list is permitted to receive the content data included in the received electronic communication data.

11. A computer-implemented method for screening electronic communications, the method comprising:
    using a processor of a computing device associated with a party desiring to send an electronic communication or a processor of a computing device in network communication with the computing device associated with the party desiring to send the electronic communication, responsive to receiving an indication that a selection tool of the computing device is positioned over a button of a graphical user interface associated with sending the electronic communication data, analyzing a domain name of an email address of at least one party listed on a recipient list of the electronic communication;
    using the analysis of the domain name, classifying the at least one party listed on the recipient list based on types of content that the at least one party is permitted to receive as defined by data access permissions of the at least one party listed on the recipient list;

analyzing contents of the electronic communication to determine whether the contents violate the data access permissions of the at least one party listed on the recipient list; and upon determining that the contents of the electronic communication violate the data access permissions of the at least one party listed on the recipient list, causing the computing device associated with the party desiring to send the electronic communication to:

disable the button of the graphical user interface and update a display of the button so as to indicate that the button is disabled;

block the electronic communication data from being transmitted to the recipient list; and output a notification indicating that at least one party listed on the recipient list is not permitted to receive the contents of the electronic communication.

12. The method of claim 11, wherein the data access permissions of the at least one party listed on the recipient list are defined by a screening list.

13. The method of claim 11, wherein the analyzing the contents of the electronic communication includes analyzing the contents using natural language processing.

14. The method of claim 11, wherein the analyzing the contents of the electronic communication includes analyzing the contents via a trained neural network model or an artificial intelligence model.

15. The method of claim 11, wherein the analyzing the contents of the electronic communication includes classifying a file type of a file included with the electronic communication.

16. The method of claim 11, wherein the notification lists the at least one party listed on the recipient list that is not permitted to receive the contents of the electronic communication.

17. The method of claim 11, wherein at least one of the classifying, determining, or providing steps is performed by a microservice.

18. The method of claim 11, wherein the using a processor of a computing device associated with a party desiring to send the electronic communication or a processor of a computing device in network communication with the computing device associated with the party desiring to send the electronic communication includes using the processor of the computing device associated with the party desiring to send the electronic communication.

19. A computer-implemented method for screening electronic communications, the method comprising:

using a processor of a computing device associated with a party desiring to send an electronic communication or a processor of a computing device in network communication with the computing device associated with the party desiring to send the electronic communication, receiving information pertaining to contents of the electronic communication and information pertaining to a recipient list of the electronic communication, wherein the information pertaining to the recipient list includes domain names associated with email addresses of parties on the recipient list;

in response to receiving, via the processor, an indication that a selection tool of the computing device is positioned over a button of a graphical user interface associated with sending the electronic communication data:

comparing the domain names to a screening list;

determining, based on the comparison, whether the domain names associated with the email addresses of parties on the recipient list are permitted to receive the contents of the electronic communication; and in response to determining that at least one of the domain names is not permitted to receive the contents of the electronic communication, causing the computing device associated with the party desiring to send the electronic communication to:

disable the button of the graphical user interface and update a display of the button so as to indicate that the button is disabled;

block the electronic communication data from being transmitted to the recipient list; and output a notification.

* * * * *